(12) United States Patent
 Clar et al.

(10) Patent No.: US 9,783,955 B1
(45) Date of Patent: Oct. 10, 2017

(54) SYSTEM AND METHOD FOR MOVING MATERIAL

(71) Applicant: Caterpillar Inc., Peoria, IL (US)

(72) Inventors: Jean-Jacques Clar, Edelstein, IL (US); Michael Taylor, Wexford, PA (US); Troy K. Becicka, Sahuarita, AZ (US); Ross McAree, Brisbane (AU); Kyle Edwards, Sahuarita, AZ (US); Peter Beasley, Brisbane (AU)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/347,232

(22) Filed: Nov. 9, 2016

(51) Int. Cl.
| | |
|---|---|
| *E02F 3/84* | (2006.01) |
| *E02F 1/00* | (2006.01) |
| *E02F 9/20* | (2006.01) |
| *G05D 1/02* | (2006.01) |
| *E02F 3/76* | (2006.01) |
| *E02F 3/04* | (2006.01) |

(52) U.S. Cl.
 CPC ............... *E02F 3/841* (2013.01); *E02F 1/00* (2013.01); *E02F 3/04* (2013.01); *E02F 3/7609* (2013.01); *E02F 9/205* (2013.01); *G05D 1/0219* (2013.01); *E02F 3/7604* (2013.01); *G05D 2201/0202* (2013.01)

(58) Field of Classification Search
 CPC .. E02F 3/841; E02F 1/00; E02F 9/205; G05D 1/0219
 See application file for complete search history.

(56) References Cited

U.S. PATENT DOCUMENTS

| | | |
|---|---|---|
| 3,301,599 A | 1/1967 | Heimaster |
| 5,140,907 A | 8/1992 | Svatek |
| 5,194,689 A | 3/1993 | Cummins |
| 5,409,298 A | 4/1995 | Dickerson et al. |
| 5,636,903 A | 6/1997 | Dickerson et al. |
| 5,875,854 A | 3/1999 | Yamamoto et al. |
| 6,108,949 A | 8/2000 | Singh et al. |
| 6,823,616 B1 | 11/2004 | Gutter et al. |
| 8,706,363 B2 | 4/2014 | Stratton et al. |
| 8,948,981 B2 | 2/2015 | Wei et al. |
| 8,983,738 B2 | 3/2015 | Avitzur et al. |
| 2014/0180444 A1 | 6/2014 | Edara et al. |

FOREIGN PATENT DOCUMENTS

| | | |
|---|---|---|
| CN | 103470262 A | 12/2013 |
| CN | 104405397 A | 3/2015 |
| CN | 104763429 A | 7/2015 |
| CN | 105781554 A | 7/2016 |

*Primary Examiner* — Basil T Jos
(74) *Attorney, Agent, or Firm* — Leydig, Voit & Mayer, Ltd.

(57) ABSTRACT

A system for moving material from a first work area to a second work area includes a change in terrain sensor, a machine position sensor, and a controller. The controller performs first material moving operations including tip head operations until the void at the second work area is filled to a predetermined extent. The controller performs second material moving operation including backstacking operations until a predetermined amount of material has been moved from the first work area.

20 Claims, 10 Drawing Sheets

SYSTEM AND METHOD FOR MOVING MATERIAL

TECHNICAL FIELD

This disclosure relates generally to controlling a machine and, more particularly, to a system and method for planning a plurality of dump locations of a work implement to optimize subsequent material moving operations.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

In some operations such as mining, it is desirable to move material from one location to another, such as to expose a layer of material to be mined. When these material moving operations are performed by machines such as dozers, the material is moved as a plurality of layers with each layer being stack or laid upon the previously formed layer. The layer creation process may be inefficient and uneven layers may result in efficient and unsteady movement over the previously formed layers.

U.S. Pat. No. 5,194,689 discloses a system for removing overburden from a mineral seam by using blast casting and a dragline. The system includes building an extended bench and then positioning the dragline on the extended bench prior to completing the process of uncovering the mineral seam.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system is provided for moving material with a machine at a work site with a ground engaging work implement along a path from a first work area to a second work area. The second work area includes a void and a low wall. The system includes a change in terrain sensor for generating change in terrain signals indicative of the change in terrain generally adjacent the machine, a machine position sensor for generating machine position signals indicative of a position of the machine, and a controller. The controller is configured to store an end location of the path, perform a first material moving operation including: determining a first operation cut location at the first work area, generating propulsion commands to move the machine loaded with material from the first operation cut location towards the low wall, determining a first change in terrain adjacent the machine based upon first change in terrain signals from the change in terrain sensor, and upon a change in terrain exceeding a change in terrain threshold, moving the machine in a reverse direction. The first material moving operation is repeated until the void is filled to a predetermined extent. The controller is further configured to perform a second material moving operation including: determining a second operation cut location at the first work area, generating propulsion commands to move the machine loaded with material from the second operation cut location towards the end location of the path, and upon reaching an end of travel position along the path, moving the machine in a reverse direction. The second material moving operation is repeated until a predetermined amount of material has been moved from the first work area.

In another aspect, a controller-implemented method is provided for moving material with a machine at a work site with a ground engaging work implement along a path from a first work area to a second work area with the second work area including a void and a low wall. The method includes storing an end location of the path, performing a first material moving operation including: determining a first operation cut location at the first work area, generating propulsion commands to move the machine loaded with material from the first operation cut location towards the low wall, determining a first change in terrain adjacent the machine based upon first change in terrain signals from a change in terrain sensor, and upon a change in terrain exceeding a change in terrain threshold, moving the machine in a reverse direction. The first material moving operation is repeated until the void is filled to a predetermined extent. The method further includes performing a second material moving operation including: determining a second operation cut location at the first work area, generating propulsion commands to move the machine loaded with material from the second operation cut location towards the end location of the path, and upon reaching an end of travel position along the path, moving the machine in a reverse direction. The second material moving operation is repeated until a predetermined amount of material has been moved from the first work area.

In still another aspect, a machine includes a prime mover, a blade for moving material at a work site along a path from a first work area to a second work area with the second work area including a void and a low wall, a change in terrain sensor for generating change in terrain signals indicative of the change in terrain generally adjacent the machine, a machine position sensor for generating machine position signals indicative of a position of the machine, and a controller. The controller is configured to store an end location of the path, perform a first material moving operation including: determining a first operation cut location at the first work area, generating propulsion commands to move the machine loaded with material from the first operation cut location towards the low wall, determining a first change in terrain adjacent the machine based upon first change in terrain signals from the change in terrain sensor, and upon a change in terrain exceeding a change in terrain threshold, moving the machine in a reverse direction. The first material moving operation is repeated until the void is filled to a predetermined extent. The controller is further configured to perform a second material moving operation including: determining a second operation cut location at the first work area, generating propulsion commands to move the machine loaded with material from the second operation cut location towards the end location of the path, and upon reaching an end of travel position along the path, moving the machine in a reverse direction. The second material moving operation is repeated until a predetermined amount of material has been moved from the first work area.

DETAILED DESCRIPTION

Figure 1:
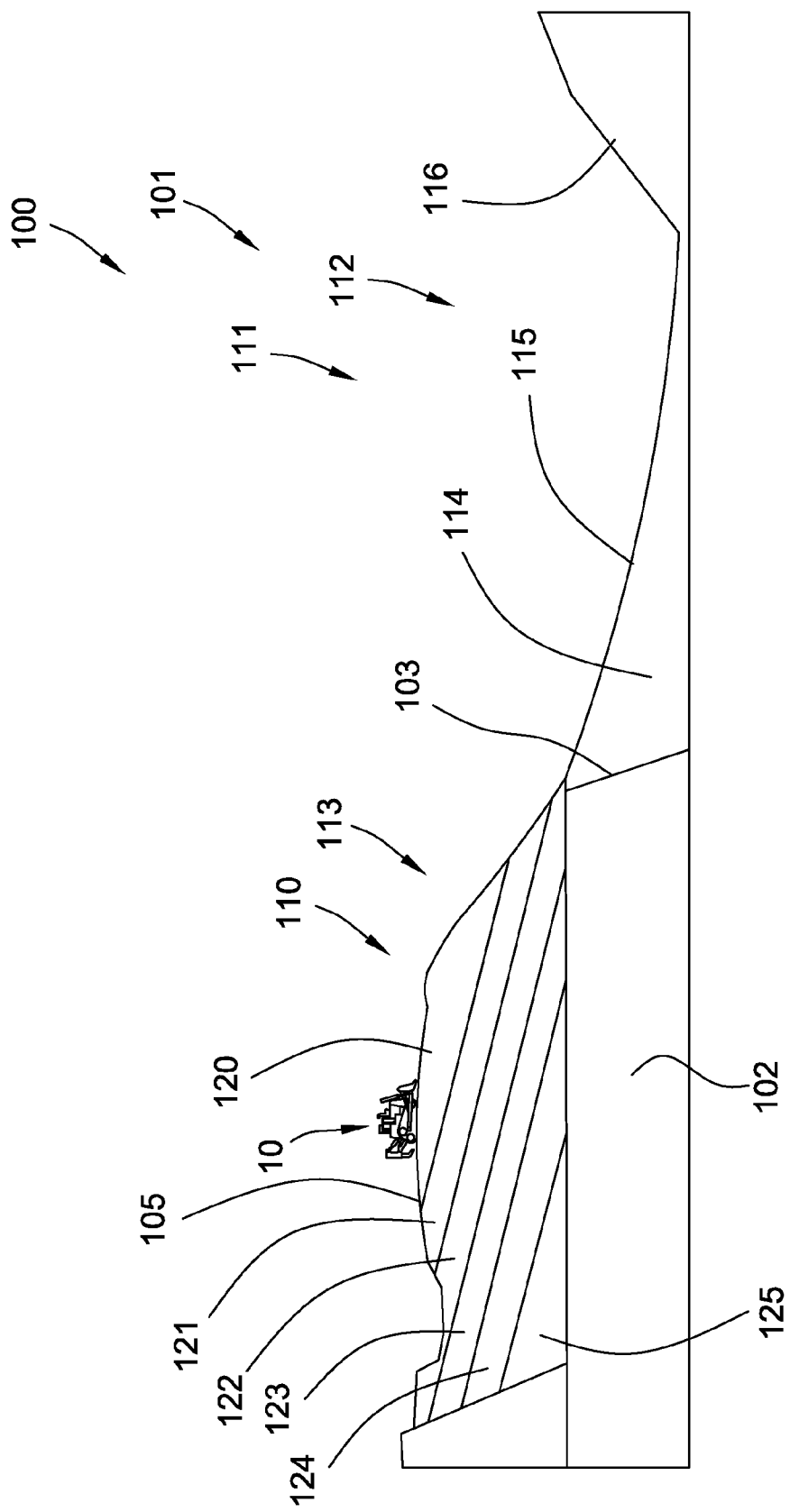
FIG. 1 depicts a diagrammatic cross-section of a portion of a work site with upper and lower layers of material illustrated.

FIG. 1 depicts a diagrammatic illustration of a portion 101 of a work site 100 which one or more machines may operate in an autonomous, a semi-autonomous, or a manual manner. Work site 100 is depicted as a mining site with lower layer 102 of material to be mined such as coal and an upper layer 105 of material such as overburden or topsoil that covers the lower layer. At some work sites 100, the overburden is removed from above a portion of the lower layer 102 of material at a first work area 110 and moved to a second work area 111. The exposed lower layer 102 of material is then removed and transported to a desired location at a remote site. The removal of the lower layer 102 of material creates an open area or void 112 into which overburden from a new or adjacent section of the upper layer 105 may be moved to expose another or adjacent portion of the lower layer. The process may be repeated about the work site 100 until the entire lower layer 102 of material is removed.

In some instances, the process of movement of the overburden may begin by moving a portion of the overburden into the void 112 adjacent the lower layer 102 such as with explosives. As depicted in FIG. 1, a portion of the upper layer 105 has been moved or displaced into the void 112 (to the right of the edge 103 of the lower layer 102 in FIG. 1). The area from which the overburden has been removed is indicated generally at 113 and the overburden moved into the void 112 is indicated at 114.

As a result of the movement of the overburden, by explosives and/or otherwise, the void 112 may have a shape as generally depicted in FIG. 1 with a first sloped surface 115 that slopes downward from generally adjacent the edge 103 of the lower layer 102 and a second sloped surface formed during a previous material movement process that extends upward from the first sloped surface. The second sloped surface may extend upward any desired distance and may be referred to as a low wall 116. In some instances, the upper end of the low wall 116 may be approximately at the same height as the upper surface of the lower layer 102. The remaining space of the void 112 is thus defined by the first sloped surface 115 and the low wall 116.

In instances in which machines such as a rope shovel (not shown) are not available, other machines 10 such as dozers may be used to move the overburden above the lower layer 102 to expose the lower layer for subsequent mining. To do so, the machines 10 may move the overburden into and above the void 112 by moving a series of relatively small layers or sections of material into the open area.

As used herein, a layer may refer to a layer or a section of material having a uniform or non-uniform (e.g., triangular) thickness or cross-section. For example, as depicted in FIG. 1, the remaining portion of the upper layer 105 of overburden to be removed is divided into a series of relatively smaller layers 120-125. Each smaller layer 120-125 may be moved from its position above the lower layer 102 to a position in or above the void 112 by utilizing the dozers to perform a series of material moving operations during which the overburden is moved from the first work area 110 to the second work area 111 to eventually expose the lower layer 102. In some instances, it may be desirable to leave a small amount of overburden on the lower layer 102 of material. Although depicted with six smaller layers 120-125, the upper layer 105 may be divided into any desired number of smaller layers. The number and position of the smaller layers may be determined by a planning system 47 described below or in any other manner.

Figure 2:
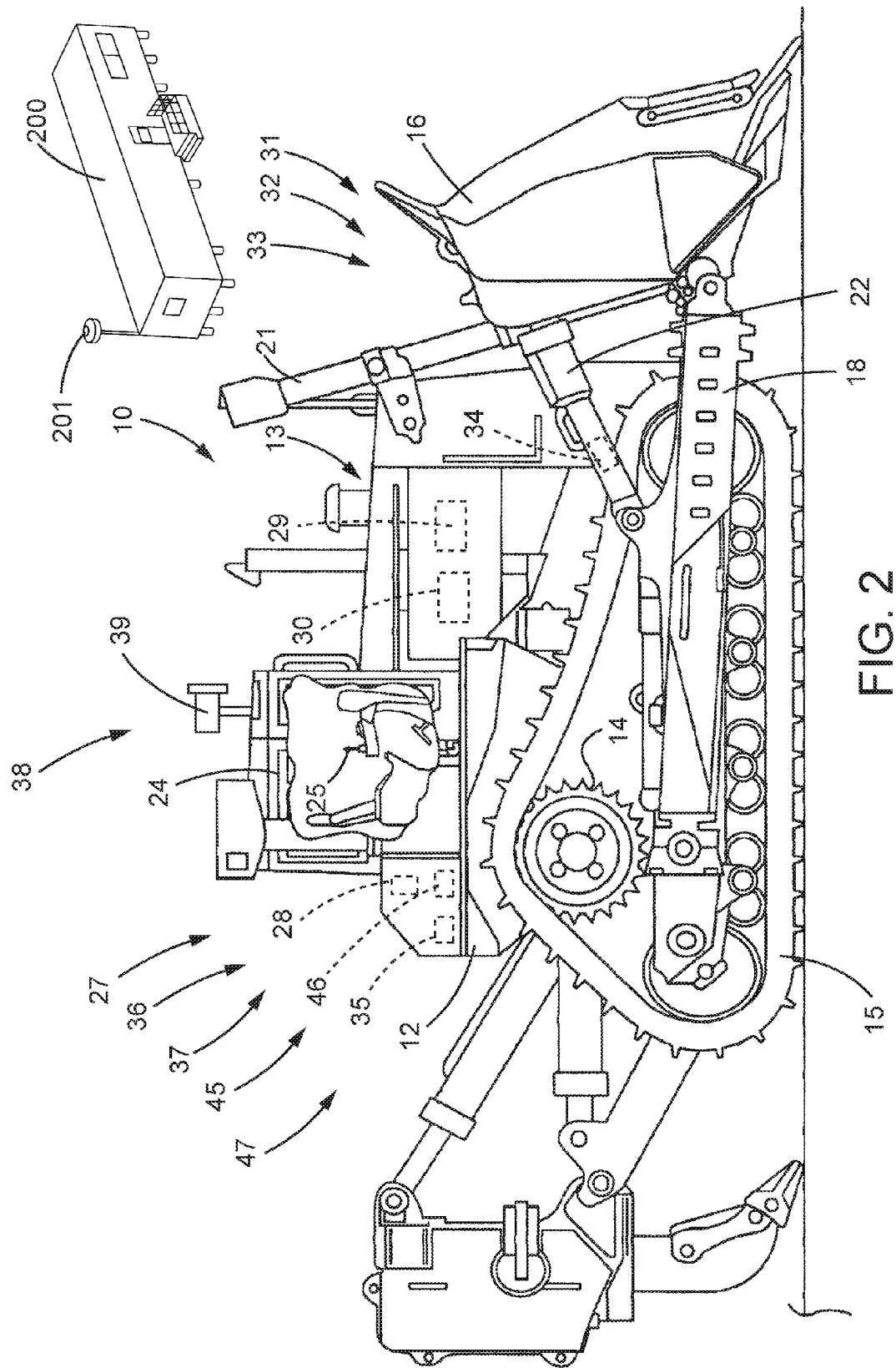
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Engine 13 and a transmission (not shown) are operatively connected to the drive sprockets 14, which drive tracks 15. The systems and methods of the disclosure may be used with any machine propulsion and drivetrain mechanisms applicable in the art for causing movement of the machine including hydrostatic, electric, or mechanical drives.

Blade 16 may be pivotably connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 45 as shown generally by an arrow in FIG. 2 indicating association with the machine 10. The control system 45 may include an electronic control module or controller 46 and a plurality of sensors. The controller 46 may receive input signals from an operator operating the machine 10 from within cab 24 or off-board the machine through a wireless communications system 201. The controller 46 may control the operation of various aspects of the machine 10 including the drivetrain and the hydraulic systems.

The controller 46 may be an electronic controller that operates in a logical fashion to perform operations, execute control algorithms, store and retrieve data and other desired operations. The controller 46 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 46 such as power supply circuitry, signal conditioning circuitry, driver circuitry, and other types of circuitry.

The controller 46 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 46 may be implemented in hardware and/or software without regard to the functionality. The controller 46 may rely on one or more data maps relating to the operating conditions and the operating environment of the machine 10 and the work site 100 that may be stored in the memory of controller. Each of these data maps may include a collection of data in the form of tables, graphs, and/or equations.

The control system 45 and the controller 46 may be located on the machine 10 and may also include components located remotely from the machine such as at a command center 200. The functionality of control system 45 may be distributed so that certain functions are performed at machine 10 and other functions are performed remotely. In such case, the control system 45 may include a communications system such as wireless communications system 201 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position sensor 28 may include a plurality of individual sensors that cooperate to generate and provide position signals to controller 46 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 46 may use position signals from the position sensors 28 to determine the position of the machine 10 within work site 100. In other examples, the position sensor 28 may include a perception based system, or may use other systems such as lasers, sonar, or radar to determine all or some aspects of the position of machine 10.

The position sensing system 27 may also be used to determine a ground speed of machine 10. Other sensors or a dedicated ground speed sensor may alternatively be used to determine the ground speed of the machine 10. In addition, the position sensing system 27 may also be used to determine the position of the work surface upon which the machine 10 is moving. More specifically, based upon known dimensions of the machine 10 and the position of the machine at the work site 100, the position of the work surface may also be determined. As a result, the position sensing system 27 may operate as either or both of a machine position sensing system and a work surface position sensing system. Similarly, the position sensor 28 may operate as either or both of a machine position sensor and a work surface position sensor. Other sensors or a dedicated work surface position sensor may alternatively be used to determine the position of the work surface.

Sensors may be provided to monitor the operating conditions of the engine 13 and drivetrain such as an engine speed sensor 29 and a torque converter speed sensor 30. Other sensors necessary or desirable for operating the machine 10 may be provided.

The control system 45 may include an additional system such as a change in terrain detection system 31 shown generally by an arrow in FIG. 2 indicating association with the machine 10. One type of change in terrain detection system 31 that may be used to sense a crest at the work site 100 may be an implement load monitoring system 32 shown generally by an arrow in FIG. 2. The implement load monitoring system 32 may include any of a variety of different types of implement load sensors depicted generally by an arrow in FIG. 2 as an implement load sensor system 33 to measure the load on the ground engaging work implement or blade 16. For example, as blade 16 of machine 10 moves material over a crest, the load on the blade will be reduced. Accordingly, the implement load sensor system 33 may be utilized to measure or monitor the load on the blade 16 and a decrease in load may be registered by the controller 46 as a change in terrain due to the machine 10 being adjacent the crest. In other instances, an increase in load may indicate an incline or the machine 10 encountering a pile of material. In other words, the controller 46 may determine a change in terrain based at least in part upon a change in the load on blade 16.

In one embodiment, the implement load sensor system 33 may embody one or more pressure sensors 34 for use with one or more hydraulic cylinders, such as second hydraulic cylinders 22, associated with blade 16. Signals from the pressure sensor 34 indicative of the pressure within the second hydraulic cylinders 22 may be monitored by controller 46. Upon receipt of a signal indicating a substantial reduction in pressure within the second hydraulic cylinders 22, the controller 46 may determine that the load on blade 16 has been substantially reduced due to the material having been pushed over a crest. Other manners of determining a reduction in cylinder pressure associated with a reduction in the load on blade 16 are contemplated, including other manners of measuring the pressure within second hydraulic cylinders 22 and measuring the pressure within other cylinders associated with the blade. An increase in pressure indicative of an increase in load may be determined in a similar manner.

In another embodiment, the implement load sensor system 33 may embody sensors for measuring a difference between output from the engine 13 and the output from a torque converter (not shown). More specifically, the engine speed sensor 29 may be utilized to generate a signal indicative of the speed or output of the engine 13 and the torque converter speed sensor 30 may be utilized to monitor the output speed of the torque converter. During an operation such as moving material with blade 16, the engine output speed indicated by engine speed sensor 29 and the torque converter output speed indicated by torque converter speed sensor 30 may be relatively constant. Upon moving material over a crest with blade 16, the load on the blade will be substantially reduced and thus cause a change in the relative speeds between the engine 13 and the torque converter. Similarly, an opposite change in relative speeds may also be used to determine an incline. Accordingly, by monitoring the difference between the engine speed and the torque converter speed, changes in incline may be determined.

Other manners of measuring differences between prime mover output and other components within the propulsion and drivetrain mechanisms that are reflective of a change in load on the implement are also contemplated. Still further, in alternate embodiments in which the machine propulsion and drivetrain mechanisms are hydrostatic or electric, the implement load sensor system may embody other sensors that detect a difference between output from the prime mover and other aspects of the propulsion and drivetrain mechanisms that may be used by the controller 46 to detect a change in load on the blade 16.

In still another embodiment, implement load sensor system 33 may embody an acceleration sensor such as a three-axis accelerometer 35 for providing an acceleration signal indicative of the acceleration of the machine 10. Upon moving a load of material past a crest, the machine 10 may accelerate due to the reduction in load on the blade 16. Similarly, deceleration of the machine 10 may indicate that the machine 10 has encountered an incline. Controller 46 may utilize acceleration of the machine 10 to determine a change in terrain.

In addition to the implement load monitoring systems 32 described above, other change in terrain detection systems may be used either alone or in combination with more than one change in terrain detection system. For example, a change in terrain detection system may use other sensors as a change in terrain sensor for determining a change in terrain. In one example, a pitch angle, as indicated by a pitch angle sensor 36, that exceeds a threshold pitch angle or is outside of an expected range of pitch angles may indicate that the machine 10 is adjacent a crest or an incline. In another example, a change in pitch rate as indicated by a pitch rate sensor 37 that exceeds a threshold rate may indicate that the machine 10 is adjacent a crest or an incline.

Still further, additional systems and sensors may be used to determine a change in terrain or proximity of machine 10 to a crest or an incline. For example, a perception system 38 may also be used to detect the physical location of a crest or an incline. The perception system 38 may be mounted on or associated with the machine, as shown generally by an arrow in FIG. 2 indicating association with the machine. The perception system 38 may include one or more systems such as a radar system, a SONAR system, a LIDAR system, a camera vision system, and/or any other desired system that operate with associated perception sensors 39. Perception sensors 39 may generate data that is received by the controller 46 and used by the controller to determine the position of the work surface upon which the machine 10 is operating including the presence and position of obstacles within the range of the sensors. If desired, the perception system 38 may be used to generate an electronic map and/or images of the environment around machine 10 and the environment analyzed for changes in terrain.

In addition or the alternative, the perception system 38 may include one or more perception sensors 39 movably associated with the machine 10 such as sensors mounted on a mobile machine or device including a drone or unmanned aerial vehicle (not shown).

Machine 10 may incorporate any or all of the change in terrain detection systems disclosed herein and may incorporate other systems that perform similar functions, if desired.

Machine 10 may be configured to move material at the work site 100 according to one or more material movement plans along a path from an initial location such as the first work area 110 to a spread or dump location such as the second work area 111. The material movement plans may include, among other things, forming a plurality of spaced apart channels or slots that are cut into the work surface to assist in moving material from the initial location to the spread or dump location.

Figure 3:
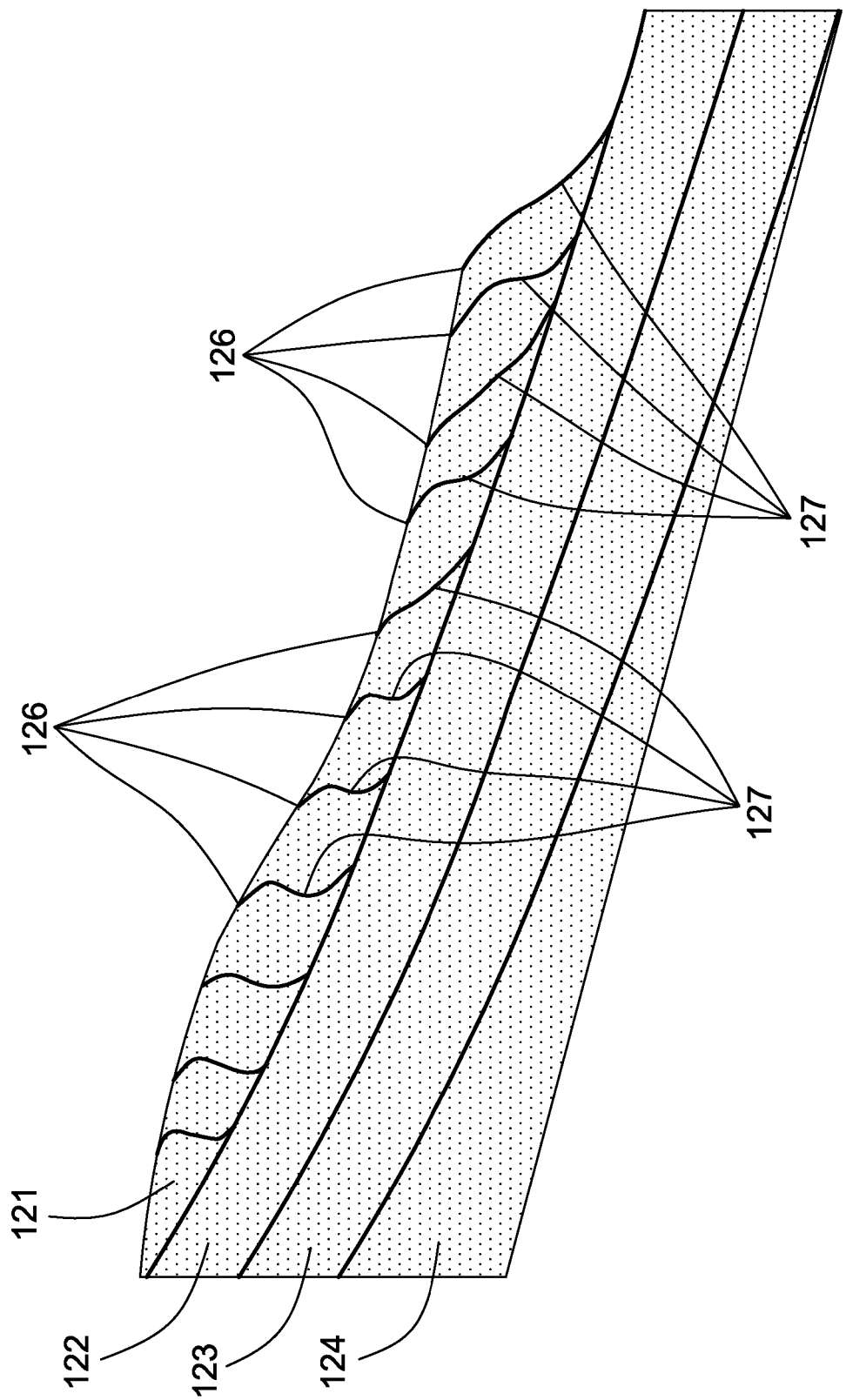
FIG. 3 depicts an enlarged diagrammatic cross-section of a portion of a work site illustrating a plurality of cutting operations.

As stated above, when moving material or overburden from the first work area 110, the upper layer 105 of material may be divided into a plurality of relatively small layers 120-125. Each small layer 120-125 of material may be removed from the first work area 110 by performing a plurality of cut and carry operations. More specifically, referring to FIG. 3, the blade 16 of machine 10 may be positioned at a desired cut location 126 and the machine 10 operated so that the blade passes through one of the small layers 120-125 to a carry surface that may be defined by the next layer of material. The machine 10 with the load of material may travel along the carry surface to a dump or spread location such as the second work area 111. The machine 10 may be moved through a series of sequential cuts 127 at cut locations 126, which are spaced apart lengthwise along each layer 120-125 of material, until the lower layer 102 of material is exposed. When operating autonomously or semi-autonomously, the Controller 46 may be configured to guide the machine 10 to execute each cut operation and carry the material along the carry surface to the second work area 111.

Figure 4:
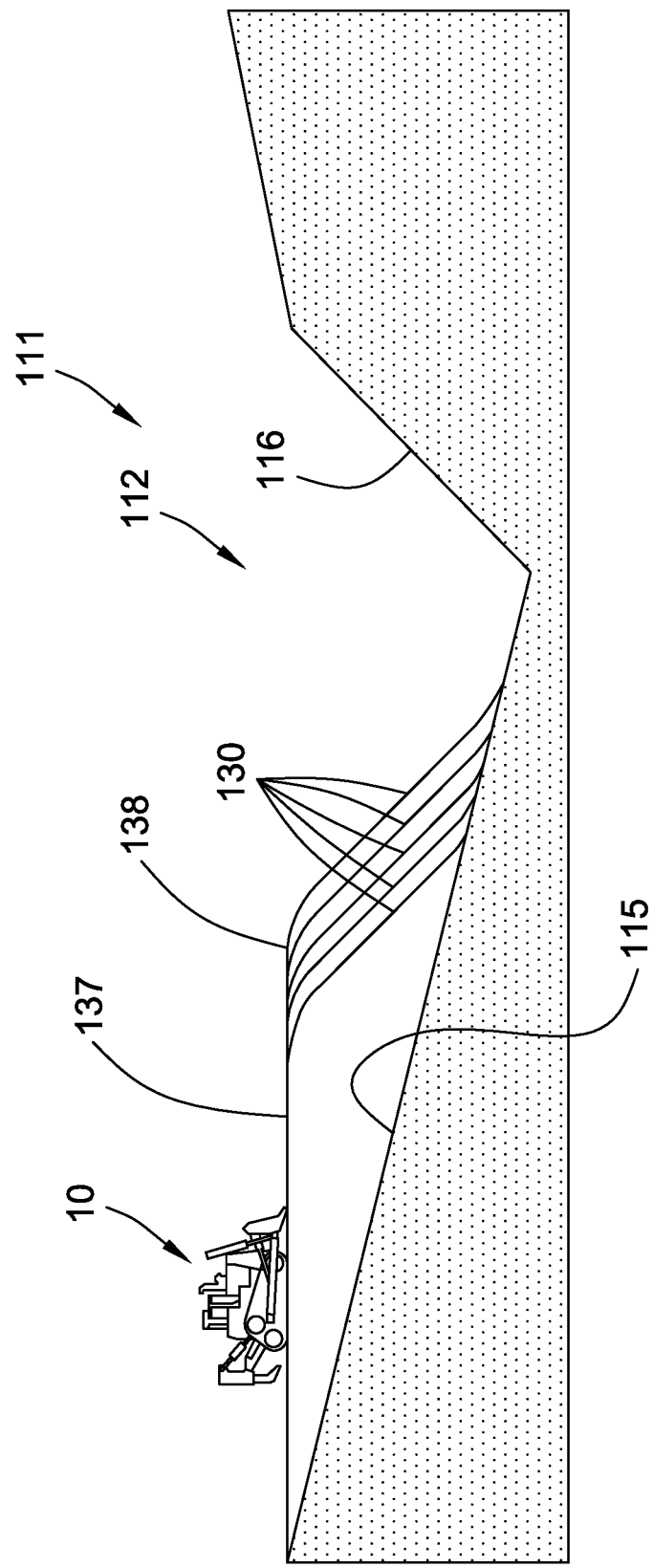
FIG. 4 depicts an enlarged diagrammatic cross-section of a portion of the work site of FIG. 1 illustrating the result of a plurality of tip head operations.

Referring to FIG. 4, a first process for spreading or dumping material involves pushing the material or overburden along the work surface until reaching a downward slope or crest. Upon reaching the crest, the overburden will fall down the slope along the crest. The process of dumping material over a crest and allowing the material to fall at the angle of repose due to gravity may sometimes be referred to as tip head dumping. In FIG. 4, examples of material dumped by a plurality of tip head dumping cycles are depicted schematically at 130.

As the material being pushed by machine 10 falls downward due to gravity, the load on the machine 10 and blade 16 will decrease. The change in terrain detection system 31 may utilize the implement load monitoring system 32 or any other system such as a perception system 38 to generate change in terrain signals that indicate a change in terrain adjacent machine 10. Upon the change in terrain exceeding a change in terrain threshold, the controller 46 may generate command signals to move the machine 10 in reverse. The machine 10 may then be operated in reverse to back up along the path of operation until reaching the next cut location and the next sequential material moving operation performed.

Figure 5:
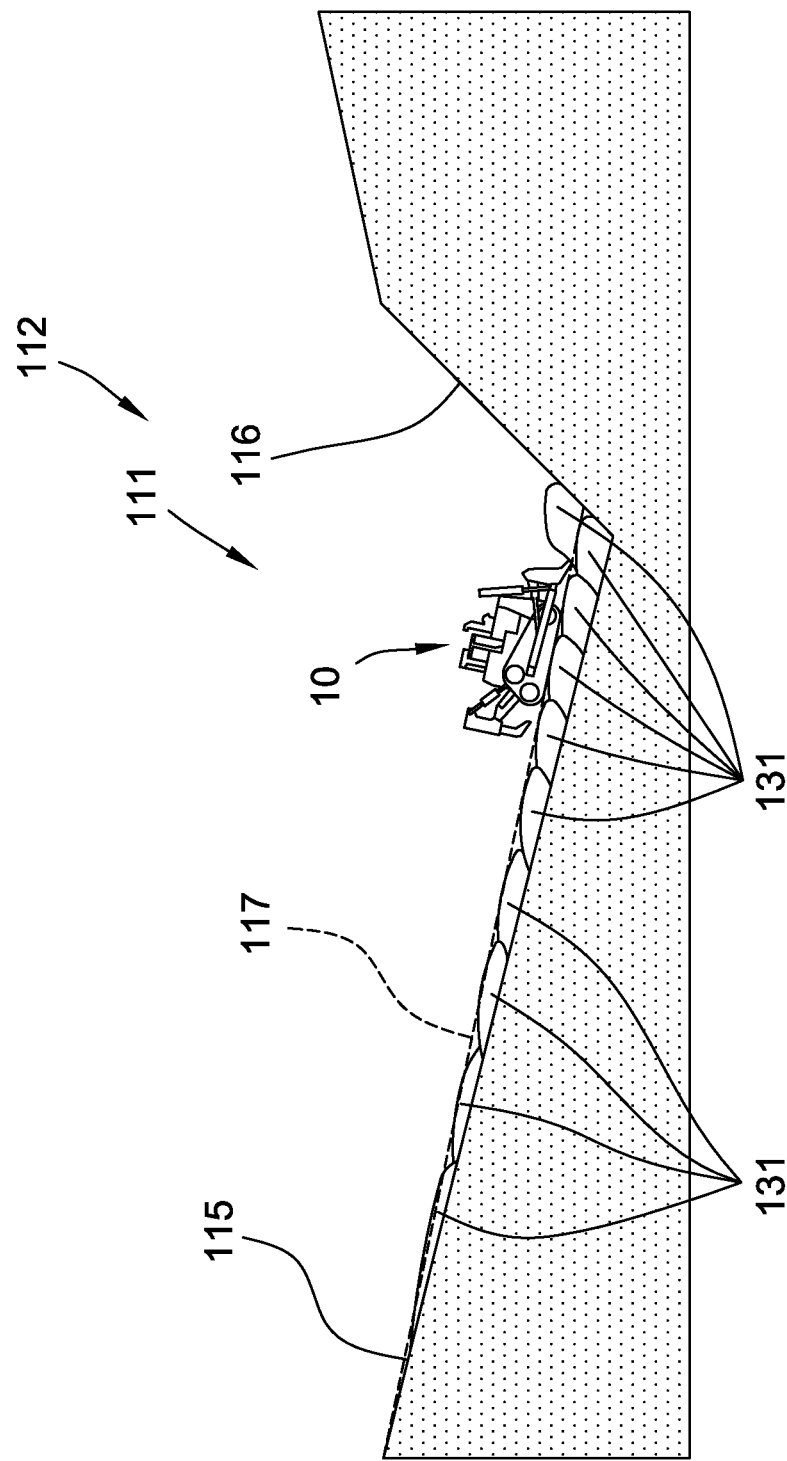
FIG. 5 depicts an enlarged diagrammatic cross-section of a portion of the work site of FIG. 1 illustrating the result of a plurality of backstacking operations.

Referring to FIG. 5, a second process for spreading or dumping material involves pushing the material or overburden along the work surface until reaching a desired end of travel location. Upon reaching the desired end location, the machine 10 is operated in reverse which leaves a pile 131 of material on the work surface along which the machine is operating. The machine 10 is moved in reverse along the path of operation until reaching the next cut location and the next sequential material moving operation performed.

In one embodiment, subsequent end of travel locations may be identified when the material being pushed by blade 16 engages the previously deposited pile 131 of material. Systems such as those used to monitor a change in terrain may detect when the material being pushed engages a previous pile 131 of material. More specifically, engagement or interaction of material being pushed with a previous pile 131 of material may be monitored by a change in load on the machine 10 and/or blade 16, deceleration of the machine, and/or a change in pitch angle of the machine. Other systems such the perception system 38 may be used in addition or instead.

In another embodiment, a planning system 47 of the control system 45 may calculate or determine a plurality of end locations at which the machine 10 should cease forward movement and back up. The end locations may be determined so that the machine 10 leaves the piles 131 of material in the desired location upon generating a reversing command or instructions.

Upon reaching a desired position at which the layer of material should end, a new layer (indicated in dashed line at 117) of piles 131 of material may be begun and the process repeated. In some instances, the machine 10 may be used to smooth the surface of the piles 131 of material to create a generally uniform surface prior to beginning a new layer of piles. The process of reversing the machine 10 to form layers of material by leaving sequential piles 131 of material as described above may sometimes be referred to as backstacking.

Each of the processes for cutting, carrying, and spreading or dumping the material may be performed autonomously, semi-autonomously, or manually, if desired. Other manners of spreading or dumping material at the second work area 111 are contemplated.

Control system 45 may include a module or planning system 47 for determining or planning various aspects of a material moving plan. The planning system 47 may determine the depth and location of each of the layers 120-125. In addition, the planning system 47 may determine the sequential cut positions along each layer as well as the shape of the cuts or loading profile through each layer. The planning system 47 may also be operative to plan other aspects of the material moving plan. For example, the planning system 47 may also determine the end locations for the piles 131 of material during a back stacking process. The planning system 47 may receive and store the characteristics of the material to be moved (e.g., density, moisture content, compactability, angle of repose) that may be used in the planning process.

INDUSTRIAL APPLICABILITY

The industrial applicability of the system described herein will be readily appreciated from the forgoing discussion. The foregoing discussion is applicable to systems in which a plurality of machines 10 are operated autonomously, semi-autonomously, or manually at a work site 100 where it is desirable to move material from a first work area 110 to a second work area 111. Such systems may be used at a mining site, a landfill, a quarry, or any other area in such movement of material is desired.

The system is applicable to work sites in which machine 10 are provided to move an upper layer 105 of material from a first work area 110 to expose a lower layer 102 of material to be mined. The material or overburden being moved may be spread or dumped in a different manner depending upon the dump location at a second work area 111. More particularly, the overburden may be dumped using a tip head process until the void 112 is sufficiently full. In some instances, it may be desirable to use the tip head dumping process until the void 112 has been filed sufficiently to reach the top of the low wall 116. Once the void 112 has been sufficiently filled, the overburden may be spread or dumped using a backstacking process.

Utilizing such a combination of tip head dumping and backstacking may improve the efficiency of the material moving process by improving the use and minimizing the impact of gravity. More specifically, utilizing the tip head process to fill the void 112 efficiently uses gravity by allowing material moved by the machine 10 to fall into the void as a result of gravity. Utilizing backstacking once the void has been filled efficiently uses gravity by reducing the distance that the machine 10 must push the overburden up hill.

Figure 6:
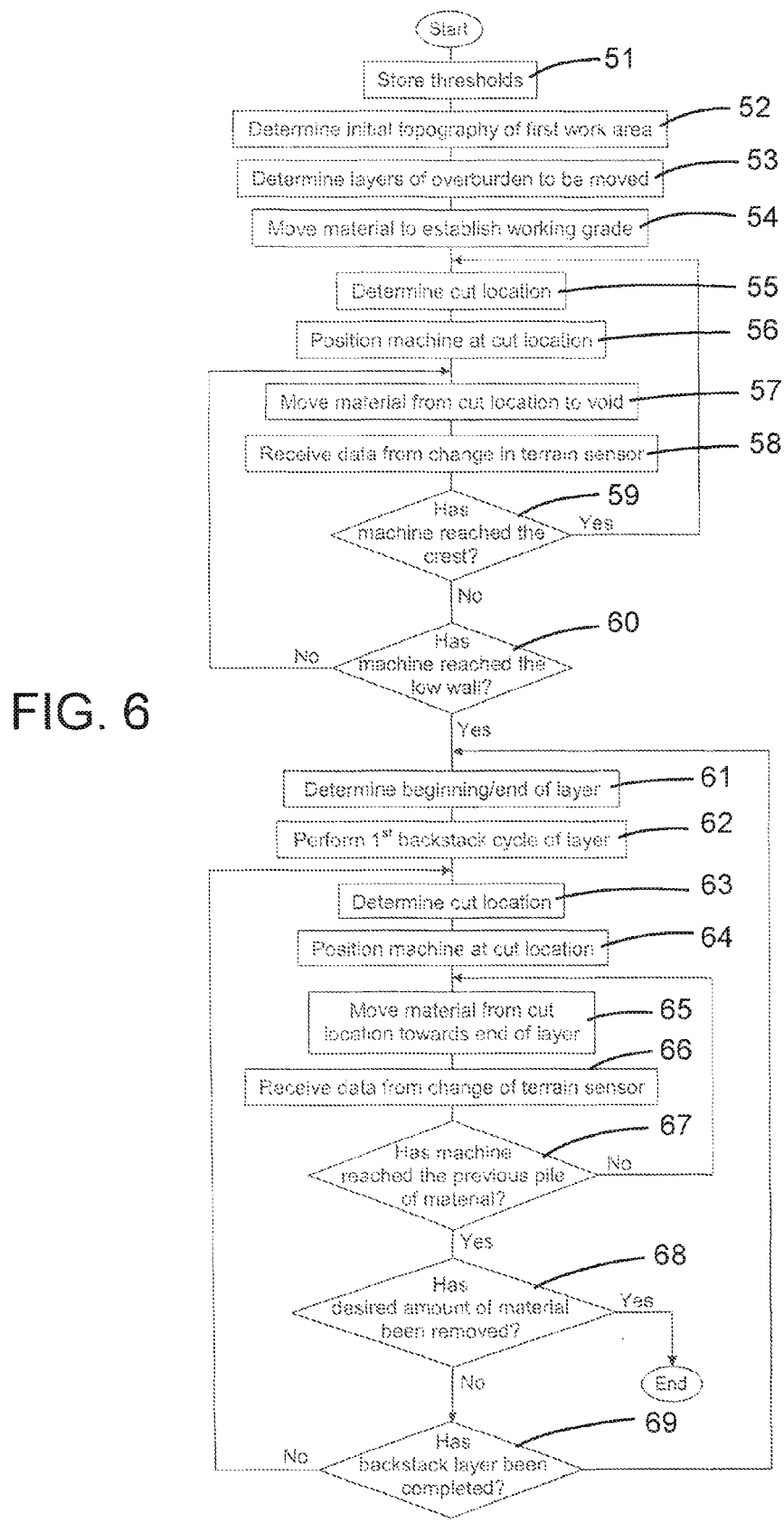
FIG. 6 depicts a flowchart illustrating a material moving process in accordance with the disclosure

FIG. 6 depicts a flow chart of an example of a material moving operation in which overburden is moved from the first work area 110 to the second work area 111. At stage 51, thresholds useful for the operation of the change in terrain detection system 31 may be stored within controller 46. An embodiment of a first threshold may be a negative change in terrain threshold that corresponds to a minimum change in terrain required to signify that the machine 10 is adjacent a downward slope or crest. The threshold may correspond to a downward slope that is sufficiently steep so that the machine should not travel down the slope when operating in an autonomous or semi-autonomous manner.

An embodiment of a second threshold may be a positive change in terrain threshold that corresponds to a minimum change in terrain required to signify that the machine 10 is adjacent an upward slope or incline. In one example, a first threshold may signify a positive change in terrain for use in identifying the location of the low wall 116 during the tip head process and a second threshold may signify a positive change in terrain for use in identifying the location of a pile 131 of material during the backstacking process.

In addition, if desired, characteristics of the material to be moved, such as the density, moisture content, compatibility, angle of repose, etc., may be stored within controller 46 for use by the planning system 47.

The initial topography of the first work area 110 may be determined at stage 52. The initial topography may be determined by any desired process. In one embodiment, a machine such as a dozer including a position sensing system 27 and/or a perception system 38 may traverse the first work area 110. In another embodiment, the initial topography may be determined by perception sensors 39 operatively associated with a remote machine or device such as a drone or unmanned aerial vehicle.

Figure 7:
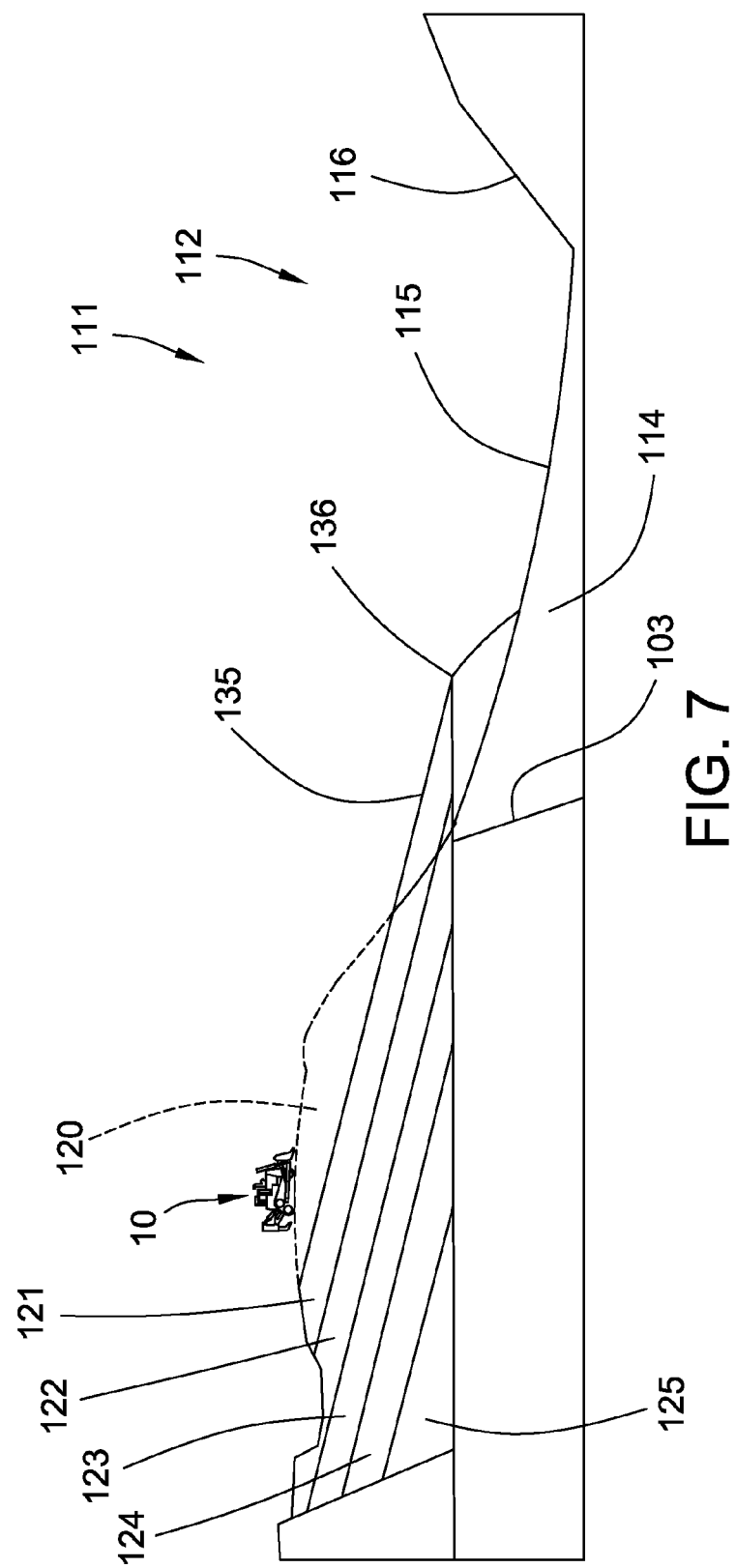
FIG. 7 depicts a diagrammatic cross-section of the portion of the work site of FIG. 1 with the void partially filled after an initial process.

At stage 53, the planning system 47 may operate to determine the number and positions of the smaller layers 120-125 configured as angled, generally horizontal layers. Material from the first work area 110 may be moved at stage 54 to establish a working surface or grade for subsequent tip head material moving operations. More specifically, as depicted in FIG. 7, overburden that forms the uppermost layer 120 of the upper layer 105 may be moved downward and to the right (as viewed in FIG. 7) to partially fill the void 112. In FIG. 7, the material moved from the uppermost layer 120 is depicted with the upper boundary in dashed line. In doing so, the moved overburden defines a work surface 135 that corresponds to slope of the second layer 121. In other words, the moved overburden forms an extension of the second layer 121. A relatively steep slope or crest 136 may be formed somewhat adjacent the edge 103 of the lower layer 102 of material. The angle of the work surface 135 may be crest 136 may correspond to the angle of repose of the overburden. The process of moving the uppermost layer 120 and transforming the void 112 into a desired shape may be performed autonomously, semi-autonomously, or manually by one or more machines 10.

Once the work surface 135 has been established, additional material movement cycles may be performed to move overburden from the first work area 110 to the second work area 111 to fill the void 112. The additional material movement cycles are initially performed using the tip head process. In doing so, the planning system 47 may determine at stage 55 the next desired cut location 126. At stage 56, the controller 46 may position the machine 10 with the blade 16 adjacent the next cut location 126. Controller 46 may generate propulsion commands at stage 57 to propel the machine 10 and control the angle of the blade 16 to cut through the overburden along the desired path to perform a cut 127 through the layer of material at the first work area 110. Continued propulsion of the machine will push the overburden along the work surface 135 until reaching the crest 136. While the machine 10 is moving towards the crest 136, the controller 46 may receive at stage 58 data from a change in terrain sensor.

At decision stage 59, the controller 46 may determine whether there has been a change in terrain such as the machine has reached the crest 136. To do so, the controller 46 may monitor data from the change in terrain detection system 31 to determine whether a change in terrain exceeds a predetermined threshold and is indicative of crest 136. In one example, a substantial decrease in the load on the machine 10 or the blade 16 may indicate that the machine is positioned adjacent the crest 136. Other manners of determining that the machine 10 is positioned adjacent the crest 136 are contemplated.

If the controller 46 determines that the machine 10 has reached the crest 136, the planning system 47 may determine the next cut location 126 and stages 55-59 repeated. It should be noted that, as discussed above, the overburden to be removed from above the lower layer 102 may be divided into a plurality of smaller layers 120-125. Once all of the material from one of the smaller layers 120-125 has been moved to the void 112, the planning system 47 may select the next cut location from the sequentially lower smaller layer. In other words, after moving all of the material from layer 121, the next cut location 126 may be taken from the next layer 122. During the course of performing a plurality of material moving cycles, the position and angle of the work surface 135 adjacent the crest 136 may be modified. For example, in FIG. 7 the work surface 135 is at an angle of approximately 20-30 degrees relative to horizontal adjacent the crest 136 but in FIG. 4 the work surface 137 is depicted as being approximately horizontal adjacent the crest 138. The angle of the work surface at any location may be configured as desired. A downwardly sloped work surface may result in a more efficient material moving process by using gravity to assist in the material movement.

If the controller 46 determines that the machine 10 has not reached the crest 136, the controller 46 may determine at its decision stage 60 whether the machine 10 has reached the low wall 116. To do so, the controller 46 may monitor data from the change in terrain detection system 31 to determine whether a change in terrain exceeds a predetermined threshold and is indicative of an incline such as the low wall 116. In one example, a substantial increase in the load on the machine 10 for the blade 16 may indicate that the machine is positioned adjacent the low wall 116. Other manners of determining that the machine 10 is positioned adjacent the low wall 116 are contemplated.

If the controller 46 determines that the machine 10 has not reached the low wall 116, the planning system 47 may determine the next cut location 126 and stages 57-60 repeated.

Figure 8:
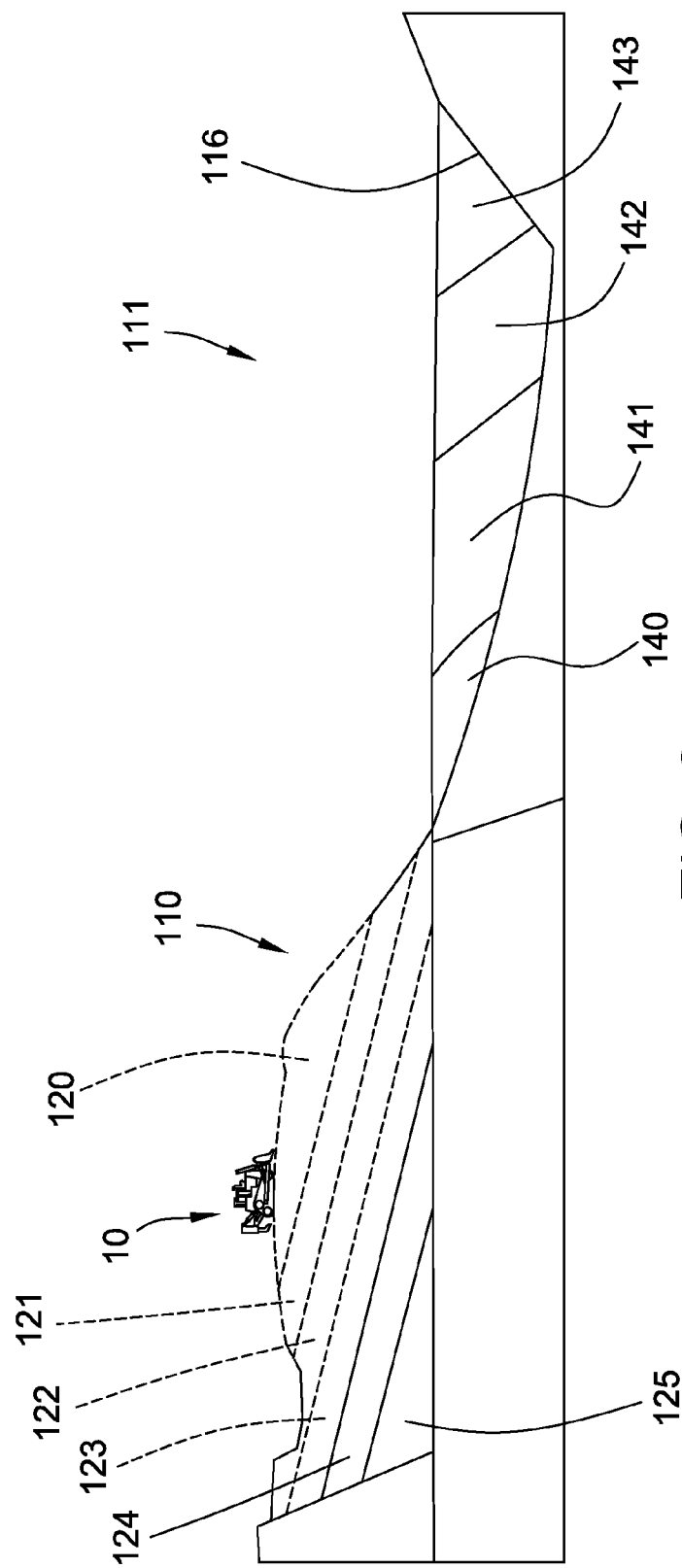
FIG. 8 depicts a diagrammatic cross-section of the portion of the work site of FIG. 1 with the void completely filled.

Once the machine 10 reaches the low wall 116, when using the tip head process, the void 112 will be filled in as depicted in FIG. 8. By using the tip head process, the angled, generally horizontal layers 120-123 fill the void 112 with a series of angled, generally vertical sections 140-143, respectively. More specifically, material from layer 120 forms section 140, material from layer 121 forms section 141, material from layer 122 forms section 142, and material from layer 123 forms section 143. For illustration purposes, each of the layers 120-123 is depicted in FIG. 8 with its upper boundary in dashed line.

If the controller 46 determines that the machine 10 has reached the low wall 116, the controller may modify the process of spreading or dumping of material at the second work area 111 to a backstacking process. At stage 61, the planning system 47 may determine the beginning location and the end location of each layer of material to be formed by the backstacking process.

The controller 46 may direct at stage 62 the machine 10 to perform the first backstacking cycle of a layer. To do so, the planning system may determine the desired cut location 126 at the first work area 110 and generate signals to position the machine 10 so that the blade is aligned with the cut location. Controller 46 may generate propulsion commands to propel the machine 10 and control the position of the blade 16 so that the blade travels through the material along the desired cutting profile through the layer of material. Continued propulsion of the machine 10 will result in the blade 16 pushing the overburden along the work surface 135 until reaching the desired end location of the initial pile 131 of material of the backstacking layer at the second work area 111. To determine whether the machine 10 has reached the desired end location for the initial pile 131 of material of the backstacking layer, the controller 46 may receive machine position signals from the position sensor 28, determine the location of the machine 10, and compare the location of the machine to the desired end location of the backstacking layer. A pile of material 131 positioned at the end location of the backstacking layer will be created upon ceasing forward movement of the machine 10 and reversing the machine.

The planning system 47 may determine at stage 63 the next desired cut location 126 at the first work area 110. At stage 64, the controller 46 may position the machine 10 with the blade 16 adjacent the next cut location 126. Controller 46 may generate propulsion commands at stage 65 to propel the machine 10 and control the angle of the blade 16 to cut through the overburden along the desired path to perform a cut 127 through the layer of material 124. Continued propulsion of the machine will push the overburden along the work surface towards the end of the backstacking layer and the previously formed pile 131 of material.

While the machine 10 is moving towards the pile 131 of material, the controller 46 may receive at stage 66 data from a change in terrain sensor. At decision stage 67, the controller 46 may determine whether the machine has reached and end of travel position such as the previous pile 131 of material. To do so, the controller 46 may monitor data from the change in terrain detection system 31 to determine whether a change in terrain exceeds a predetermined threshold and is indicative of a pile 131 of material. In one example, a substantial increase in the load on the machine 10 or the blade 16 may indicate that the material being pushed by the blade is positioned adjacent the previous pile 131 of material. Other manners of determining that pile 131 of material being pushed is adjacent the previous pile of material are contemplated.

If the controller 46 determines that the machine 10 has not reached the previous pile 131 of material, the controller may continue to propel the machine towards the previous pile of material and stages 65-67 repeated. If the controller 46 determines that the machine 10 has reached the previous pile 131 of material, the controller may determine at decision stage 68 whether a desired amount of material has been removed from the first work area 110. In other words, the controller 46 may determine whether the lower layer 102 has been sufficiently uncovered to permit subsequent mining of the material forming the lower layer. If the desired amount of material has been removed or moved from the first work area 110, the material moving operation may be terminated.

If the desired amount of material has not been removed, the controller 46 may determine at decision stage 69 whether the backstacking layer has been completed. In doing so, the controller 46 may receive machine position signals from the position sensor 28, determine the location of the machine 10, and compare the location of the machine to the desired beginning location of the backstacking layer.

If the backstacking layer has not been completed, the next pile 131 of material may be formed by repeating stages 63-69. If the backstacking layer has been completed, a new backstacking layer may be begun. In doing so, a beginning location and end location of the new backstacking layer may be determined by the planning system 47 and stages 61-69 repeated.

Figure 9:
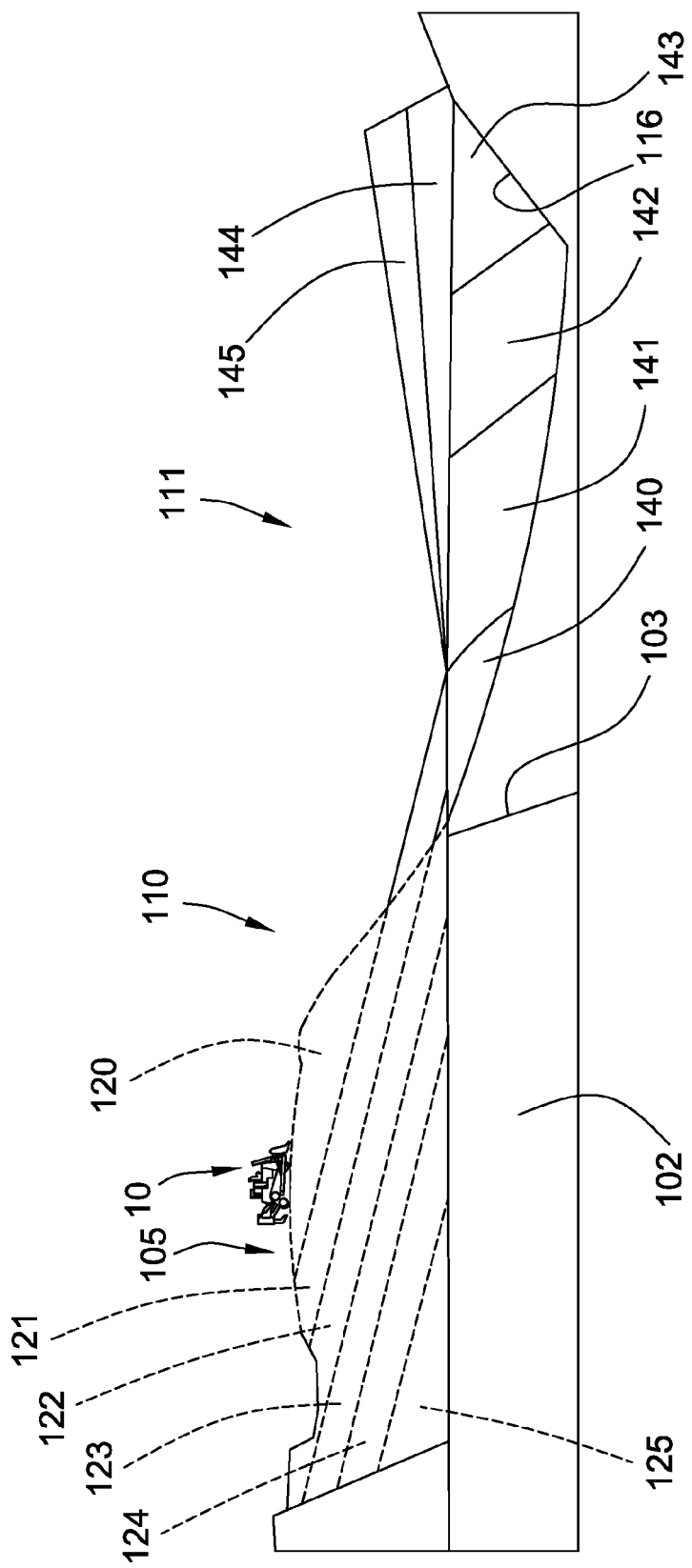
FIG. 9 depicts a diagrammatic cross-section of the portion of the work site of FIG. 1 with additional material disposed above the void.

Referring to FIG. 9, by using the backstacking process, the material removed from the angled, generally horizontal layers 124-125 is positioned as triangular layers 144-145 above the angled, generally vertical sections 140-143 that fill the void 112. More specifically, material from layer 124 forms triangular layer 144 and material from layer 125 forms triangular layer 145. For illustration purposes, each of the layers 124-125 is depicted in FIG. 9 with its upper boundary in dashed line.

Figure 10:
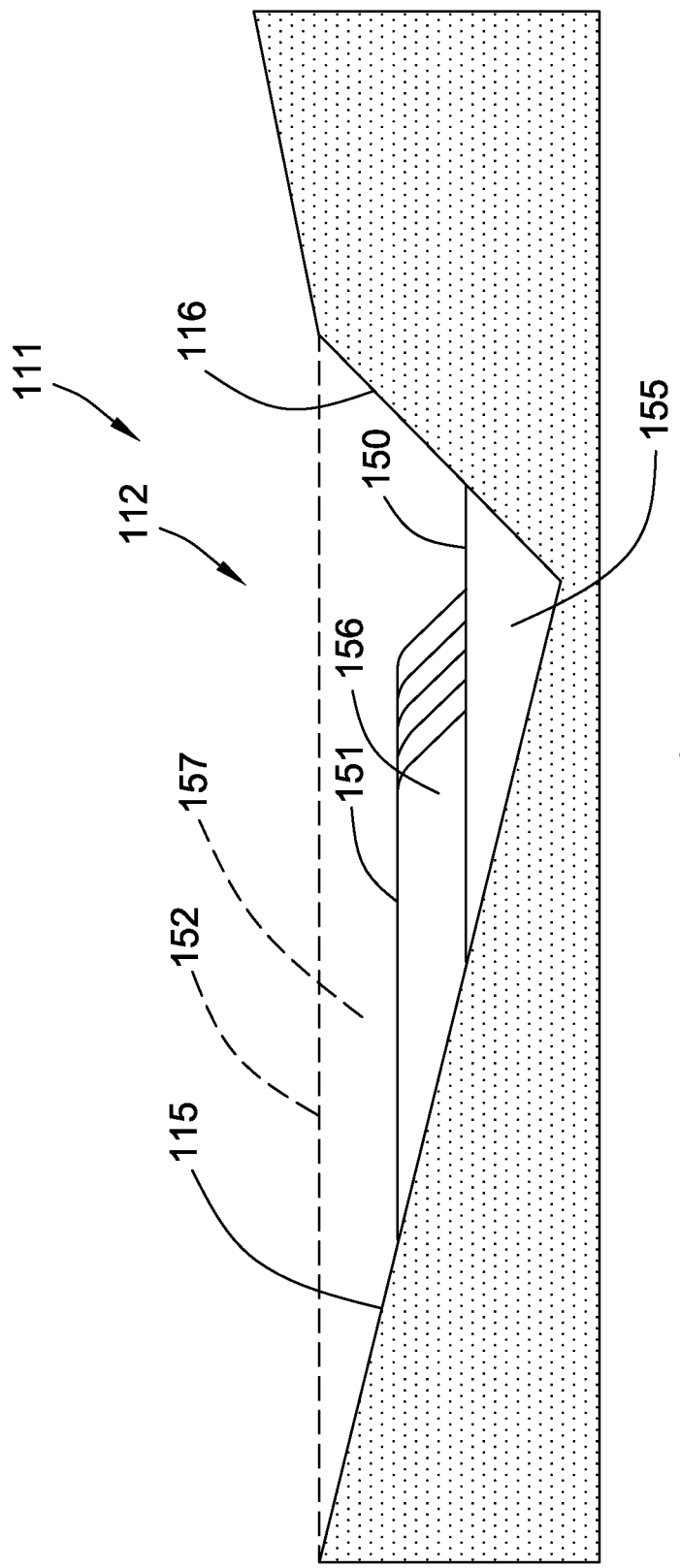
FIG. 10 depicts an enlarged diagrammatic cross-section similar to FIG. 4 but illustrating tip head operations being performed along horizontal work surfaces at different elevations.

Various alternate material moving processes are contemplated. For example, rather than utilizing a work surface 137 for the tip head process that generally matches the elevation of the lower layer 102 as depicted in FIG. 4, the void 112 may be filled in by using a series or plurality of work surfaces 150-152 as depicted in FIG. 10. The tip head process may be used with machine 10 moving along work surface 150 to fill a generally horizontal lower portion 155 of void 112. Upon reaching the low wall 116, a new work surface 151 may be formed above the previous work surface 150 and the tip head process used along the new work surface as depicted at 160. Using the tip head process along work surface 151 will fill a generally horizontal middle portion 156 of void 112. Upon reaching the low wall 116, another work surface, depicted in dashed line at 152, may be formed above the previous work surface 151 and the tip head process used along the new work surface. Using the tip head process along work surface 152 will fill a generally horizontal upper portion 157 of void 112. Each of the work surfaces 150-152 may be sloped or horizontal and the work surfaces may be parallel, generally parallel, or the angle between the surfaces may change. As stated above, a downwardly sloped work surface may result in a more efficient material moving process by using gravity to assist in the material movement. By setting the height of the work surface used with the tip head process, the extent to which the void 112 is filled may be set. If the work surfaces 150-152 are horizontal, the lower portion 155, the middle portion 156, and the upper portion 157 will have a generally horizontal upper surface. If the work surfaces 150-152 are sloped, the lower portion 155, the middle portion 156, and the upper portion 157 will have an angled, generally horizontal upper surface.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for moving material with a machine at a work site with a ground engaging work implement along a path from a first work area to a second work area, the second work area including a void and a low wall, comprising:
   a change in terrain sensor for generating change in terrain signals indicative of the change in terrain generally adjacent the machine;
   a machine position sensor for generating machine position signals indicative of a position of the machine; and
   a controller configured to:
      store an end location of the path;
      perform a first material moving operation including:
         determining a first operation cut location at the first work area;
         generating propulsion commands to move the machine loaded with material from the first operation cut location towards the low wall;

determining a first change in terrain adjacent the machine based upon first change in terrain signals from the change in terrain sensor;

upon a change in terrain exceeding a change in terrain threshold, moving the machine in a reverse direction;

repeating the first material moving operation until the void is filled to a predetermined extent;

perform a second material moving operation including:

determining a second operation cut location at the first work area;

generating propulsion commands to move the machine loaded with material from the second operation cut location towards the end location of the path;

upon reaching an end of travel position along the path, moving the machine in a reverse direction; and repeating the second material moving operation until a predetermined amount of material has been moved from the first work area.

2. The system of claim 1, further including a position sensor for generating position signals indicative of a position of a work surface upon which the machine is moving and the controller is configured to determine the position of the work surface and determine each first operation cut location and each second operation cut location based upon the position of the work surface.

3. The system of claim 1, wherein the first material moving operation is repeated until the machine reaches the low wall.

4. The system of claim 1, wherein the first material moving operation is repeated until the void is filled.

5. The system of claim 1, wherein the controller is further configured to divide the first work area into a plurality of angled, generally horizontal layers.

6. The system of claim 1, wherein the first material moving operations fill the void with a plurality of angled, generally vertical sections.

7. The system of claim 6, wherein the second material moving operations positions material from the first work area in a plurality of triangular layers above the angled, generally vertical sections.

8. The system of claim 1, where each first material moving operation includes moving material along a work surface to a crest.

9. The system of claim 1, wherein the first material moving operation includes moving material along a first work surface to fill a first generally horizontal portion of the void, moving material along a second work surface above the first work surface to fill a second generally horizontal portion of the void, and moving material along a third work surface above the second work surface to fill a third generally horizontal portion of the void.

10. The system of claim 1, wherein the change in terrain is determined based upon a change in load on the ground engaging work implement determined based upon a change in pressure of hydraulic cylinders operatively connected to the ground engaging work implement.

11. The system of claim 1, wherein the change in terrain is determined based upon a change in load on the machine as determined from a change in relative speeds between a prime mover and a torque converter.

12. The system of claim 1, wherein the end of travel position of each second material moving operation is determined based upon a change in load on the ground engaging work implement determined based upon a change in pressure of hydraulic cylinders operatively connected to the ground engaging work implement.

13. The system of claim 1, wherein the end of travel position of each second material moving operation is determined based upon a change in load on the machine as determined from a change in relative speeds between a prime mover and a torque converter.

14. The system of claim 1, wherein the end of travel position of each second material moving operation is determined based upon the position of the machine as determined from the machine position signals.

15. A controller-implemented method for moving material with a machine at a work site with a ground engaging work implement along a path from a first work area to a second work area, the second work area including a void and a low wall, comprising:

storing an end location of the path;

performing a first material moving operation including:

determining a first operation cut location at the first work area;

generating propulsion commands to move the machine loaded with material from the first operation cut location towards the low wall;

determining a first change in terrain adjacent the machine based upon first change in terrain signals from a change in terrain sensor;

upon a change in terrain exceeding a change in terrain threshold, moving the machine in a reverse direction;

repeating the first material moving operation until the void is filled to a predetermined extent;

performing a second material moving operation including:

determining a second operation cut location at the first work area;

generating propulsion commands to move the machine loaded with material from the second operation cut location towards the end location of the path;

upon reaching an end of travel position along the path, moving the machine in a reverse direction; and repeating the second material moving operation until a predetermined amount of material has been moved from the first work area.

16. The method of claim 15, further including determining a position of the work surface with a position sensor associated with the machine and determining each first operation cut location and each second operation cut location based upon the position of the work surface.

17. The method of claim 15, further including repeating the first material moving operation until the machine reaches the low wall.

18. The method of claim 15, further including dividing the first work area into a plurality of angled, generally horizontal layers.

19. The method of claim 15, further including filling the void with a plurality of angled, generally vertical sections during the first material moving operations and positioning material from the first work area in a plurality of triangular layers above the angled, generally vertical sections during the second material moving operations.

20. A machine, comprising:

a prime mover;

a blade for moving material at a work site along a path from a first work area to a second work area, the second work area including a void and a low wall;

a change in terrain sensor for generating change in terrain signals indicative of the change in terrain generally adjacent the machine;

a machine position sensor for generating machine position signals indicative of a position of the machine; and a controller configured to:
store an end location of the path;
perform a first material moving operation including:
determining a first operation cut location at the first work area;
generating propulsion commands to move the machine loaded with material from the first operation cut location towards the low wall;
determining a first change in terrain adjacent the machine based upon first change in terrain signals from the change in terrain sensor;
upon a change in terrain exceeding a change in terrain threshold, moving the machine in a reverse direction;
repeating the first material moving operation until the void is filled to a predetermined extent;
perform a second material moving operation including:
determining a second operation cut location at the first work area;
generating propulsion commands to move the machine loaded with material from the second operation cut location towards the end location of the path;
upon reaching an end of travel position along the path, moving the machine in a reverse direction; and
repeating the second material moving operation until a predetermined amount of material has been moved from the first work area.

\* \* \* \* \*